United States Patent [19]
Fritz et al.

[11] Patent Number: 5,684,382
[45] Date of Patent: Nov. 4, 1997

[54] CONTROL OF COMPUTER AC ADAPTER OUTPUT VOLTAGE VIA BATTERY PACK FEEDBACK

[75] Inventors: Brian C. Fritz, The Woodlands; William C. Hallowell, Spring; Thomas P. Sawyers, Houston; Norman D. Stobert, Spring; Robert K. Watts, Houston; Michael E. Schneider, Conroe, all of Tex.

[73] Assignee: Compaq Computer Corporation, Houston, Tex.

[21] Appl. No.: 684,686

[22] Filed: Jul. 19, 1996

[51] Int. Cl.$^6$ .................... H01M 10/44; H01M 10/46
[52] U.S. Cl. ............................................. 320/5; 320/39
[58] Field of Search .................... 320/5, 30, 31, 320/32, 35, 39, 48, 49, 9, 10

[56] References Cited

U.S. PATENT DOCUMENTS

| | | | |
|---|---|---|---|
| 5,187,425 | 2/1993 | Tanikawa | 320/31 |
| 5,382,893 | 1/1995 | Dehnel | 320/32 |
| 5,541,489 | 7/1996 | Dunstan | 320/48 X |
| 5,557,188 | 9/1996 | Piercey | 320/5 |
| 5,561,361 | 10/1996 | Sengupta et al. | 320/14 |
| 5,572,110 | 11/1996 | Dunstan | 320/30 |
| 5,576,611 | 11/1996 | Yoshida | 320/31 |

OTHER PUBLICATIONS

Duracell Intel® Smart Battery Data Specification, pp. 1–36, Feb. 1995.
Intel® System Management Bus Specification, pp. 1–17, Apr., 1994.
Duracell Intel® Smart Battery Charger Specification, pp. 1–31, Sep. 1994.

*Primary Examiner*—Edward Tso
*Attorney, Agent, or Firm*—Pravel, Hewitt, Kimball & Krieger

[57] ABSTRACT

A computer system including circuitry for accurately and economically controlling the charge voltage and charge current at the terminals of its rechargeable battery. During a battery recharge, sensor circuitry coupled to the battery provides accurate data to a battery microcontroller regarding the charge voltage and charge current present at the battery terminals. A battery microcontroller relays this information to a multipurpose microcontroller. The battery microcontroller also provides the desired charging voltage and current as determined by the battery pack's charging algorithm. The multipurpose microcontroller uses the battery status information to program an addressable potentiometer. In turn, the potentiometer generates an adjustment signal that controls the output voltage of the computer's AC adapter. Preferably, the AC adapter is capable of being operated in a constant-power mode. Adjustment of the potentiometer allows the output of the AC adapter to be dithered up or down as needed to provide the desired charging voltage and charging current to the battery.

15 Claims, 8 Drawing Sheets

CONTROL OF COMPUTER AC ADAPTER OUTPUT VOLTAGE VIA BATTERY PACK FEEDBACK

BACKGROUND OF THE INVENTION

1. Field of the Invention

The present invention relates to a computer system capable of using a battery pack for power, and more particularly to an improved method for controlling the output voltage of the computer's AC adapter as seen at the terminals of the battery pack.

2. Description of the Related Art

An increased dependency on portable computers has spurred the development and refinement of the rechargeable battery packs. Battery packs are currently the most popular alternative to conventional alternating current power. The battery packs may incorporate batteries of various chemistries, including nickel-cadmium (NiCd), nickel-metal-hydride (NiMH), and lithium ion (Li+) batteries. Many other battery technologies—such as lithium polymer, zinc-air and rechargeable alkaline—are currently being developed. All of the aforementioned batteries are capable of providing power to a portable computer system for several hours.

Although NiMiH and Li+ batteries of a given size and weight offer a higher energy density than a similar NiCd battery, they impose stricter operating requirements. One fundamental requirement of these batteries is that precise control be maintained over the charging process. Improper charging has the potential to cause the battery to be damaged, and may reduce the maximum life cycle (number of times a battery can be effectively recharged) and maximum power obtainable from a battery during a discharge cycle.

Over- or undercharging by just a few percentage points can greatly affect cycle life and performance. For example, charging a Li+ battery with a supply voltage as little as 100 mV beyond its specified voltage can significantly degrade cycle life. Conversely, charging with a supply voltage as low as 100 mV below the specified voltage may significantly reduce the percentage of full charge that can be achieved.

Although external chargers can be used, the battery pack is frequently recharged by the power supply of the host computer system when alternating current is available. Computer users almost always prefer not to be bothered with monitoring the details of the charging process. Preferably, the user would rather be able to initiate the charge and then let the charger determine when and how to terminate the process.

In order to facilitate charging and discharging, a sensor circuit is often integrated into the battery pack to monitor the voltage of each cell and to provide fuel gauging. Fuel gauging is the process of determining how much useful charge remains in the battery, and is typically accomplished by coulomb counting. The sensor circuit can also determine whether the cell is in one of at least four states.

When a nickel-based or Li+ cell becomes deeply discharged, the terminal cell voltage drops to a deeply discharged minimum voltage indicating that the cell cannot be recharged and it is usually thrown away. Another state for the cell is indicated by a slightly higher voltage than the deeply discharged minimum voltage, indicating that the cell is discharged but can be recharged. A third state is indicated when the cell is properly charged and capable of providing power to the computer system. A fourth state for the cell occurs when the terminal voltage exceeds a maximum voltage, indicating an overcharged cell.

In what are known as "intelligent" or "smart" battery packs, the sensor circuit within the pack supplies battery cell voltage, temperature, and other information to a dedicated battery microcontroller. The microcontroller in turn determines whether the battery pack needs to be charged, could be discharged, or needs to be thrown away. The microcontroller is typically configured to communicate with the host computer's microprocessor or other battery management circuitry. A battery pack of this type also includes a charge switch and a discharge switch, controlled by the microcontroller, which enable or disable the charging and discharging of the battery pack according to the state of the battery's cells and control information provided by the host computer system.

Unlike conventional loads, NiMH rechargeable batteries act as a source of increasing voltage as they accept charge. These batteries are most commonly charged using a constant-current method. The voltage starts to rise as the battery is being charged. At the same time, the temperature of the battery also rises because of an exothermic reaction inside the battery. Temperature measurements are therefore sometimes used in the charge termination method for these batteries.

Li+ batteries, unlike some of their nickel-based counterparts, also require a constant current source for the first stage of the charging process. A current limited voltage source may be utilized during this stage. A constant voltage source is then required to complete the charging process.

One problem can arise when recharging a battery pack with a computer's AC adapter while the computer is running. That problem is determining how the current to the battery should be limited when the AC adapter and the computer load being driven are in parallel with the battery. The problem is exacerbated by variances in computer power consumption due to events such as hard drive accesses. Normally, either a very tightly controlled and expensive AC adapter is used, or a secondary regulator is used, which is less efficient and somewhat expensive.

SUMMARY OF THE INVENTION

Briefly, the present invention relates to circuitry for accurately and economically controlling the charge voltage at the terminals of a rechargeable battery in a computer system. A feedback loop is utilized between sensors located in the battery pack and output control or dithering circuitry that controls the output of the AC adapter being used to charge the battery pack.

The battery pack utilizes a serial communications bus interface to communicate with a multipurpose microcontroller within the computer system. Preferably, the serial communications bus conforms to the standard I²C-bus specification. The charge state of the installed battery pack as well as other information is communicated from the battery pack microcontroller to the multipurpose microcontroller, which has a battery charge-control function assigned to it as an additional software task.

Battery status information is provided by a sensor circuit coupled to the battery cells and the microcontroller of a battery pack conforming to the present invention. During recharge, the sensor circuit provides accurate data to the battery microcontroller regarding the charge voltage and charge current present at the battery terminals. In turn, the battery microcontroller relays this information to the multipurpose microcontroller. The battery microcontroller also provides the desired charging voltage or current as determined by the battery pack's charging algorithm. Monitoring the charging voltage at the battery terminals negates the effect of series resistances between the output of the AC adapter and the battery, and can be used to dynamically account for spikes in computer power consumption.

Using information from the battery pack, the multipurpose microcontroller communicates over the I²C-bus to a programmable potentiometer. The potentiometer is used to generate an adjustment signal that controls the output voltage of the computer's AC adapter. The adjustment signal takes the form of a DC current drawn from a control terminal of the AC adapter. In the preferred embodiment, the AC adapter has a base output voltage and an adjustment range of 256 steps. The AC adapter is capable of being operated in a constant-power mode.

If the desired voltage at the battery terminals does not match the actual voltage, a correction signal is sent to adjust the equivalent resistance of the potentiometer. Adjustment of the potentiometer causes the output of the AC adapter to be incremented or dithered up or down as needed to provide the desired charging voltage to the battery. The present invention thereby provides an accurate method of controlling the charge voltage at the terminals of a rechargeable battery, while also alleviating the need for a tightly controlled AC adapter or a secondary regulator. The adjustable AC adaptor output voltage also allows for indirect control of charge current. For example, the amount of charge current supplied to the battery can be decreased by lowering the charge voltage at the battery terminals.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,201, filed Jul. 19, 1996, entitled "MULTIFUNCTION POWER AND KEYBOARD CONTROLLER," by David J. Delisle, William C. Hallowell and Patrick R. Cooper, filed concurrently herewith;

U.S. application Ser. No. 08/684,413, filed Jul. 19, 1996, entitled "FLASH ROM PROGRAMMING," by Patrick R. Cooper, David J. Delisle and Hung Q. Le, filed concurrently herewith;

U.S. application Ser. No. 08/684,414, filed Jul. 19, 1996, entitled "FLASH ROM SHARING," by Hung Q. Le and David J. Delisle, filed concurrently herewith;

U.S. application Ser. No. 08/684,486 filed Jul. 19, 1996, entitled "BUS SYSTEM FOR SHADOWING REGISTERS," by Dwight D. Riley and David I. Maguire, filed concurrently herewith;

U.S. application Ser. No. 08/684,412, filed Jul. 19, 1996, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485, filed Jul. 19, 1996, entitled "LONG LATENCY INTERRUPT HANDLING AND INPUT/OUTPUT WHILE POSTING," by David J. Maguire and James R. Edwards, filed concurrently herewith;

U.S. application Ser. No. 08/684,710, filed Jul. 19, 1996, entitled "SERIAL BUS SYSTEM FOR SHADOWING REGISTERS," by David J. Maguire and Hung Q. Le, filed concurrently herewith;

U.S. application Ser. No. 08/684,584, filed Jul. 19, 1996, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. application Ser. No. 08/671,316, filed Jul. 19, 1996, entitled "TWO ISA BUS CONCEPT," by Gregory N. Santos, James K Edwards, Dwight D. Riley and David J. Maguire, filed concurrently herewith;

U.S. application Ser. No. 08/684,490, filed Jul. 19, 1996, entitled "RECONFIGURABLE DUAL MASTER IDE INTERFACE," by Gregory N. Santos, David I. Maguire, William C. Hallowell and James R. Edwards, filed concurrently herewith; and U.S. application Ser. No. 08/684,255, filed Jul. 19, 1996, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

Figure 1:
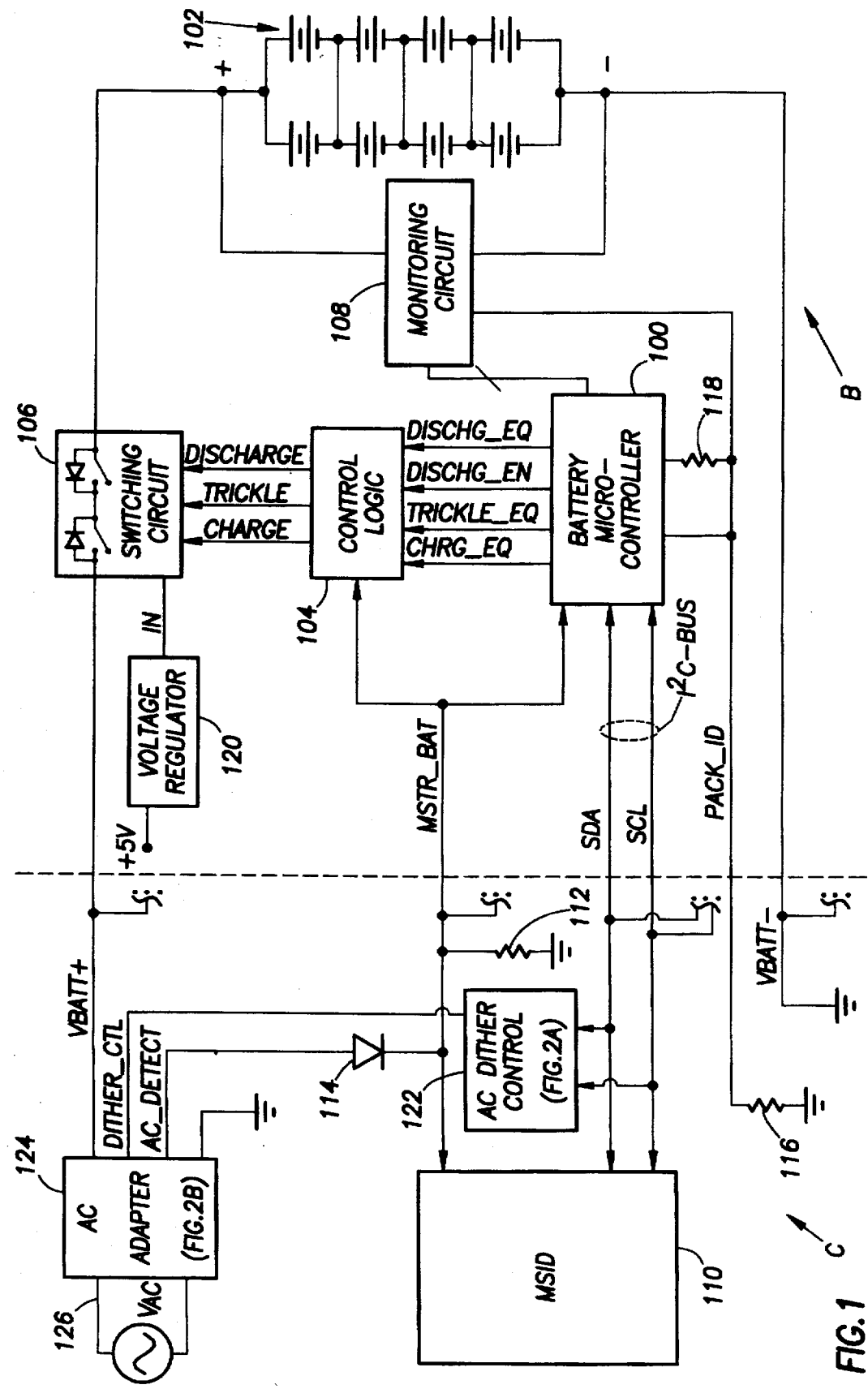
FIG. 1 is a block diagram illustrating a battery pack inserted into a host computer system according to the present invention.

Turning now to the drawings, FIG. 1 is a block diagram of a battery pack B inserted into a host computer system C. In the disclosed embodiment, host computer C is capable of both receiving power from and supplying power to battery pack B. The terminals VBATT+ and VBATT− are voltage levels at the positive and negative terminals, respectively, of battery pack B over which power is supplied to and received from host computer system C. FIG. 1 depicts a single installed battery pack B, although the capability is present to support a greater number of detachable battery packs incorporating like circuitry to that shown in FIG. 1.

Referring first to battery pack B, a battery microcontroller 100 is provided and operates in a manner to be set forth to provide supervisory functions for controlling the charging and discharging of the battery cells 102. A CHARG_EQ signal, a TRICKLE_EQ signal, a DISCHG_EN signal, and a DISCHG_EQ signal are provided by the battery microcontroller 100 to a control logic block 104. These signals are used by the control logic block 104 in generating control signals for various elements of a switching circuit 106. In particular, the control logic block 104 provides a CHARGE signal, a TRICKLE signal, and a DISCHARGE signal to the switching circuit 106. The control logic block 104 and the switching circuit 106 provide circuitry to inhibit or permit charge from entering or leaving battery cells 102. The CHARGE signal, the TRICKLE signal, and the DISCHARGE signal control the charging of the battery cells 102, the trickle charging of the battery cells 102, and the main discharging of the battery cells 102, respectively. The assertion of one of these three control signals enables its function.

The switching circuit 106 is connected to a positive terminal "+" of the battery cells 102. In the preferred embodiment, the battery cells 102 of the battery pack B are four series banks of two parallel lithium ion cells each, but various other configurations are contemplated.

Various transistors in the switching circuit block 106 are used to control the voltage VBATT+ supplied by (or received by) the battery cells 102, as well as current flowing into and out of the battery pack B. In the preferred embodiment, both power contacts for the voltages VBATT+ and VBATT− are capable of supplying a four ampere continuous load. In addition, these two power contacts are disabled if the battery pack determines that a charging voltage or current is being applied without valid handshaking over the control lines. The switching circuit 106 is also connected to the unregulated voltage input IN of a voltage regulator 120, which supplies a supply voltage of +5 volts.

Also shown in FIG. 1 is a monitoring circuit 108, which is connected to the "+" and "−" terminals of the battery cells 102. The monitoring circuit provides information to the battery microcontroller 100 regarding the status of the battery cells 102 during charging as well as discharging. Functions provided by the monitoring circuit 108 include: battery cell overvoltage monitoring, cell undervoltage monitoring, overdischarge current monitoring, and overcharge current monitoring.

The circuit topology of the monitoring circuit 108 may be of several types, and its implementation can take many forms. A sample implementation has been described in commonly-owned U.S. patent application Ser. No. 08/605,727, entitled "SENSOR CIRCUIT FOR PROVIDING MAXIMUM AND MINIMUM CELL VOLTAGES OF A BATTERY" filed on Feb. 22, 1996 and hereby incorporated by reference. Improved current detection circuit exemplary of that contemplated for use with the present invention has been described in U.S. patent application Ser. No. 08/605,724, entitled "COMPUTER BATTERY PACK CHARGE CURRENT SENSOR WITH GAIN CONTROL" filed on Feb. 22, 1996, and hereby incorporated by reference. In the preferred embodiment of the invention, the voltages VBATT+ and VBATT− are measured as closely as possible to the terminals of the battery cells 102.

The relationship between the monitored data of battery 102 and the state of its charge depends on the battery's chemistry and construction. The fuel gauging and recharging algorithms must therefore be tailored to specific types of batteries in order to insure fast and safe charging. The state of charge can be inferred by a variety of methods; including monitoring the battery temperature, which rises during charging in many types of batteries. The thermal characteristics of a charging battery can also be monitored to determine if too much current or voltage is being provided. It is desirable to be able to use the same hardware for charging a variety of battery types. The mixed-signal microcontroller 100 of the disclosed battery pack B is therefore capable of supporting a variety of cell technologies, battery assemblies, or battery configurations. Algorithms for new battery chemistries can be integrated with minimal effort.

Turning now to the host computer C portion of FIG. 1, a multi-function mobile super input/output chip MSIO 110 is included in the preferred embodiment. The MSIO 110 provides various processing and control functions, and communicates with the battery microcontroller 100 via a standard I²C-bus and a master battery signal MSTR_BAT. The inter-integrated circuit (IC) or I²C-bus is a simple hi-directional two wire bus for efficient inter-IC control. Details of the I²C-bus can be found in the "The I²C-Bus and How to Use It (Including Specification)," published by Phillips Semiconductors, January 1992.

Briefly, the I²C-bus consists of two lines: a serial clock (SCL) and a serial data line (SDA). Each of these lines is bi-directional. The SCL line provides the clock signal for data transfers which occur over the I²C-bus. Logic levels for this signal are referenced to the voltage VBATT−, which is common to all installed battery packs B. The SDA line is the data line for data transfers which occur over the I²C-bus. Again, logic levels for this signal are referenced to the voltage VBATT−. The battery microcontroller 100 of each additional battery pack is also coupled to the MSIO 110 via the I²C-bus, as schematically indicated in FIG. 1. Low value series resistors (not shown) are typically provided at each device connection for protection against high-voltage transient impulses or spikes.

Each device connected to the I²C-bus is recognized by a unique address—whether it is the MSIO 110 or the battery microcontroller 100 of any installed battery pack B. The MSIO 110, the battery microcontroller 100 and the AC dither control circuit 122 incorporate an on-chip interface which allows them to communicate directly with each other via the I²C-bus. Using the I²C-bus in cooperation with the master battery signal MSTR_BAT reduces the number of interface signals necessary for efficient battery management. Co-pending U.S. patent application No. 08/573,296, entitled "BATTERY PACK WAKEUP" and filed on Dec. 15, 1995, illustrates various aspects of nickel-based and lithium ion battery packs and communications over a serial bus. This application is hereby incorporated by reference.

In the disclosed embodiment, the MSIO 110 acts as an I²C-bus master and the battery microcontroller 100 serves as an I²C-bus slave except when the battery executes an attention signal. Following an attention signal, the MSIO 110 polls installed battery packs B one at a time to give them a chance to communicate. The battery microcontroller 100 can set a number of flags that indicate the type of attention it is requesting. These flags include: a REQUEST TO CHARGE flag, which remains set until permission to charge is granted; a REQUEST TO SET CHARGING VOLTAGE AND CURRENT flag, which indicates that the battery is being charged and needs to adjust its charging voltage and current; a CHARGE TERMINATION flags; a CHARGE STATUS flag, which indicates whether the battery is or is not charging; and a PERMANENT FAILURE flag, which indicates that a condition has occurred that renders the battery permanently disabled.

After the MSIO 110 determines that a REQUEST TO CHARGE flag has been set, it undertakes an arbitration process and eventually sends a permission to charge command to the requesting battery pack B. After receiving a REQUEST TO SET CHARGING VOLTAGE AND CURRENT, the MSIO 110 issues a read command to the battery microcontroller 100 to retrieve the desired charging voltage and current values. These values are then multiplied by appropriate scaling factors to determine real voltage and current values. Details of the communications between the battery pack B and the computer system C described above are provided below in conjunction with FIGS. 4, 5, 6A and 6B.

The input for the AC adapter 124 is typically between 90 and 265 VAC RMS. Nominal voltage for the U.S. market is considered to be 120 VAC. The output voltage of adapter 124 must meet the maximum charge voltage of the battery pack B and the power-supply input voltage range of the portable computer C.

In the preferred embodiment, the AC adapter 124 is a conventional 45-Watt single output AC-to-DC module power supply assembly intended for world-wide use in information technology equipment. The AC adapter 124 is self-contained and powered from AC mains (not shown), and supplies a single direct current (DC), constant power output. No power switch is shown, as output power is supplied upon application of an AC input through an electrical cord 126.

In the disclosed embodiment, the output voltage VBATT+ of the AC adapter 124 while in a constant voltage mode is approximately +14.1 Vdc+±2%. The output voltage VBATT+ can be adjusted upwards an additional +4.75 Vdc ±3% while in this mode. Adjustment of the output voltage VBATT+ is accomplished by a voltage adjustment signal DITHER_CTL. When in a constant power mode, the minimum output voltage is +10.0 Vdc. Details of the dithering circuitry incorporated within the AC adapter 124 are provided in FIG. 2B.

The adjustment signal DITHER_CTL is supplied to the AC adapter 124 by the AC dither control circuitry 122, which is described more fully below in conjunction with FIG. 2A. The adjustment signal DITHER_CTL takes the form of a DC current drawn from the AC adapter 124. In the disclosed embodiment, a DITHER_CTL current of zero mA results in no adjustment to the nominal output voltage of 14.1 Vdc ±2%. A DITHER_CTL current of 1.00 mA ±2% drawn from the AC adapter 124 sets the output voltage VBATT+ at 4.75 Vdc ±3% above the nominal output voltage. Any value of DITHER_CTL current between zero and 1 mA results in a proportional adjustment to the output voltage VBATT+. The output voltage is higher than the nominal voltage by a factor expressed according to the formula ((current adjustment in amps)×(4750 Ohms)) ±1%. The tolerance of ±1% is attributable to the resistor 214 of FIG. 2B. For currents between 0 and 1 mA, the power supply pulls the voltage of the DITHER_CTL line above 3.5 Vdc.

When in a constant power range, the output current of an AC adapter 124 according to the disclosed embodiment is such that the product of the output voltage and output current (V×I) is approximately in the range of 40 to 46 Watts for output voltages above 11 V. For output voltages below 11 V, the supplied power is approximately 44 to 46 Watts.

The host computer C also includes a resistor 116 to aid in the generation of an analog PACK_ID signal. The PACK_ID signal is used to define the physical location of any installed battery pack within the computer system C. Each different battery slot within the computer system C couples its PACK_ID signal to a distinctive ohmage resistor 116 in the computer C. Each different resistor 116 of the various battery slots is thus of slightly different or distinctive ohmage from the others. When the various detachable battery packs B are installed in the host computer C, one end of the resistor 116 connected thereto is referenced to ground, while the other end is coupled to the battery microcontroller 100 through a connector resistor 118, which is typically of large ohmage. The various resistors 116 and 118 thus form a group of voltage dividers, and the voltage present at the common node (the PACK_ID signal) is dependent on the values of the involved resistors. The voltage level of the PACK_ID signal is thus different for each installed battery pack. Each voltage level thus represents a unique assigned receptor or slot location within the computer system C.

The PACK_ID signal is provided to the monitoring circuit 108. In the disclosed embodiment, the battery microcontroller 100 may request a digital representation of the voltage level of the PACK_ID signal from the monitoring circuit 108. The battery microcontroller 100 can then determine the value of the resistor 116 and resolve the battery pack's physical location and address within the system. The PACK_ID signal is coupled directly to an "interrupt on transition" input to the battery microcontroller 100. Before a battery pack B is installed, the PACK_ID signal is pulled to the positive supply by the large ohmage resistor 118. When the battery pack B is initially inserted into the computer system C, a transition on the PACK_ID signal serves to "wake up" the battery pack B and cause an attention signal to be sent to the computer system C via the I²C-bus. The attention signal alerts the host computer C to a newly installed battery pack B.

A bi-directional master battery signal MSTR_BAT is communicated between the battery microcontroller 100, control logic block 104, and the MSIO 110. In the preferred embodiment, all installed battery packs also receive and drive the master battery signal MSTR_BAT. This signal is used to indicate which, if any, battery pack B is supplying power to or being charged by the host computer C. Master battery pack selection can be based on the charge status of installed battery packs, slot order, or various other criteria. The battery pack B selected to be the master battery asserts the master battery signal MSTR_BAT while all other installed battery packs and the MSIO 110 monitor the signal waiting for it to be deasserted. A low transition of the master battery signal MSTR_BAT generally signifies that the current master battery pack has either been removed or is no longer capable of supplying power.

When no battery packs are installed in the host computer C, a pulldown resistor 112 pulls the master battery signal MSTR_BAT to a logic low level. Likewise, when the battery pack B serving as the master battery pack is removed from the host computer C, resistor 112 pulls the master battery signal MSTR_BAT low. The transition to a low level causes the discharge FETs of all other installed battery packs to turn on.

The master battery signal MSTR_BAT is also used by the computer system C to indicate the presence of AC line power. If AC power is available, the AC adapter 124 asserts the AC detect signal AC_DETECT. The signal AC_DETECT combined in a logic OR configuration with the master battery signal MSTR_BAT by a diode 114. Therefore, if the signal AC_DETECT is high, the master battery signal MSTR_BAT is also high. Many other methods of detecting AC power could be utilized.

Figure 2A:
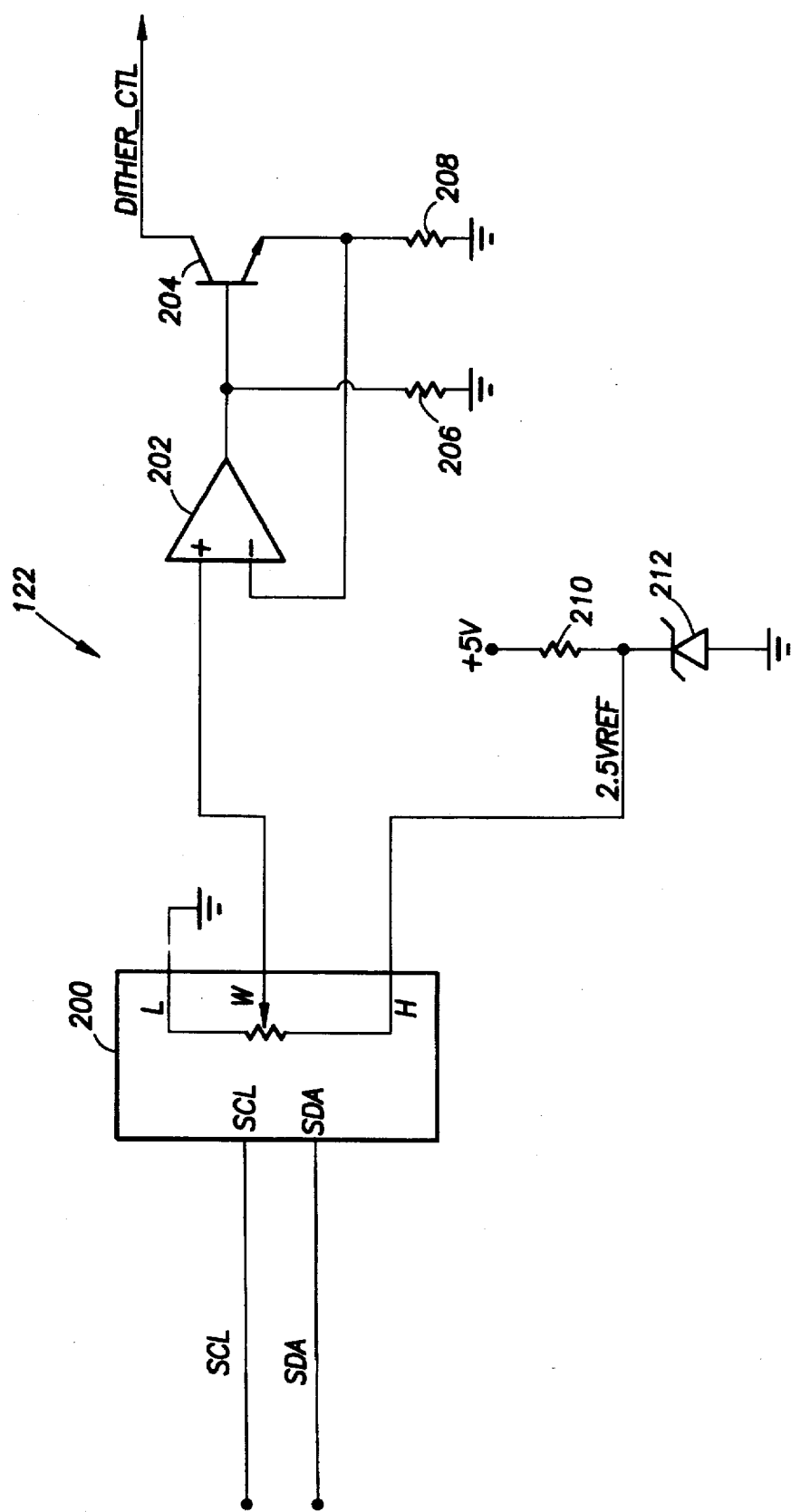
FIG. 2A is a detailed schematic diagram of the AC dither control circuit of FIG. 1.

Referring now to FIG. 2A, details of the AC dither control circuit 122 are provided. The circuitry of FIG. 2A is used to adjust the control signal DITHER_CTL (implemented as a current amplitude value in the disclosed embodiment) to the AC adapter 124. Following a request from the battery pack B to adjust its charging current or charging voltage, the MSIO 110 sends a dither up or dither down command to a programmable potentiometer 200 via the I²C-bus. Adjustment of the potentiometer value causes the output voltage of the AC adapter to be raised or lowered as needed to provide the desired charging voltage or charging current to the battery. In an alternate embodiment of the invention, the battery microcontroller 100 could be configured to provide dither up and dither down signals directly to the AC dither control circuitry 122 or directly to the AC adapter 124.

In the preferred embodiment, the potentiometer 200 is an addressable digital potentiometer supplied by Dallas Semiconductor Corporation. The potentiometer 200 is composed of a 256 position resistor array with a total resistance of 100 K$\Omega$. An 8-bit register is used to set the wiper position on the resistor array. This register can be written or read over the I²C-bus. In the disclosed embodiment, the AC adapter 124 dither range is: 18.85–14.50 volts=4.75 volts. This results in a resolution of approximately: 5 V/256 steps≅0.02 V/step. With a battery impedance of 150 m$\Omega$, the current change per dither step is therefore approximately:

$$\frac{.020V}{step} \times \frac{1}{150m\Omega} = 130 \text{ mA/step}$$

As disclosed, the potentiometer value is initially set such that the output voltage of the AC adapter 124 is at its lowest operating value for safety reasons. The battery pack B is then relied upon to provide the charge voltage as measured at the battery 102 terminals, as well as the desired charge voltage. Depending on the chemistry type, the necessary charging voltages and currents of a new battery can be lower than those required by an older battery. Hence, the wiper of the potentiometer 200 can be set to a lower value when charging certain types of new batteries.

The low side L of the potentiometer 200 is connected to a ground plane. A precision micropower shunt voltage reference 212 is provided to establish a reference signal 2_5 VREF of 2.5 volts at the high side of the potentiometer 200. One end of the voltage reference 212 is connected to the ground plane, while the output is connected to the H input of the potentiometer 200. Setup current for the voltage reference 212 is supplied by an external series resistor 210 connected between the supply voltage +5 V and the output of the voltage reference 212. The wiper output of the potentiometer 200 therefore forms a programmable voltage divider between ground and the 2.5 volt reference.

The wiper output of the potentiometer is connected to the non-inverting input of an operational amplifier 202. The output of the amplifier 202 is provided to the base of an npn-type bipolar transistor 204. The collector of the bipolar transistor 204 is connected to the control line DITHER_CTL of the AC adapter 124. A load resistor 208 connects the emitter of the bipolar transistor 204 to ground. The common node between the emitter of the bipolar transistor 204 and the load resistor 208 is also fed back to the inverting input of the amplifier 202. A pulldown resistor 206, connected between the base of the bipolar transistor 204 and ground, is provided to turn off the transistor when its base is not being driven by the amplifier 202.

During normal operation, the amplifier 202, the bipolar transistor 204 and the load resistor 208 combine to form a current sink path from the control line DITHER_CTL of the AC adapter 124. Due to the feedback path to the inverting input of the amplifier 202, the voltage at the emitter of the transistor 204 is approximately equal to the voltage at the non-inverting of the amplifier. The current amplitude of the signal DITHER_CTL is therefore dictated by the voltage present at the non-inverting input of the amplifier 202, which in turn is set by the programmable potentiometer 200. In the preferred embodiment, the bipolar transistor 204 operates in its forward-active region during normal operation. Many other circuits could be used to vary the signal DITHER_CTL, and the precise implementation of the AC dither control circuit 122 is not crucial to the invention.

Figure 2B:
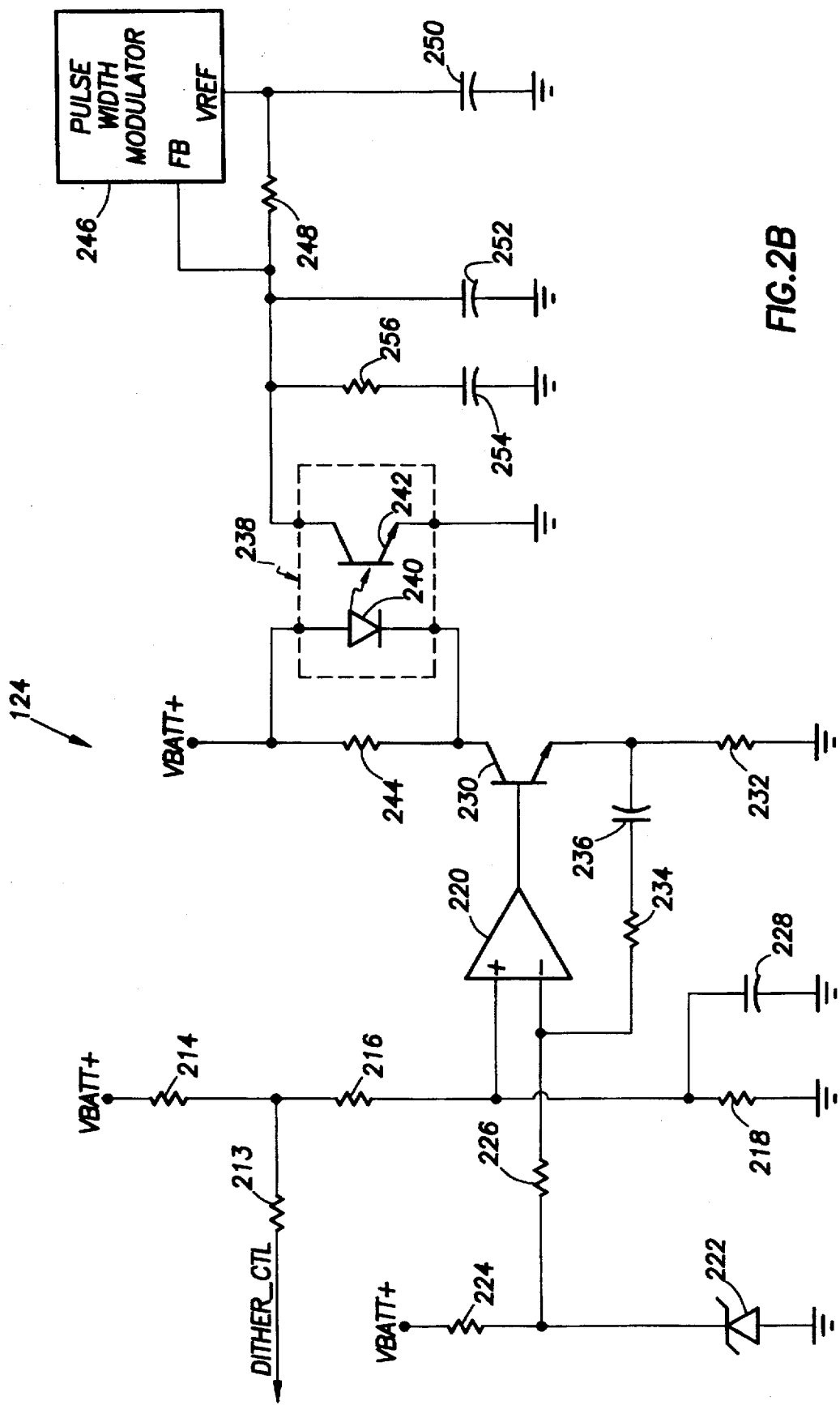
FIG. 2B is a detailed schematic diagram of portions of the AC adapter incorporating dithering circuitry.

Details of the portions of AC adapter 124 that enable dithering of its output voltage are shown in FIG. 2B. Referring now to that figure, circuitry is provided for adjusting the voltage at the feedback input (FB) of a standard pulse width modulator (PWM) 246. According to the invention, adjusting the current amplitude of the signal DITHER_CTL results in an adjustment to the voltage at the FB pin of the PWM 246, which in turn alters the output voltage of the AC adapter 124. Additional details of the AC adapter 124 are known to those skilled in the art and are omitted for sake of clarity.

Resistors 214, 216 and 218 form a voltage divider between VBATT+ and ground. One side of the resistor 214 is connected to VBATT+ while its other side is connected to the resistor 216. A third resistor 218 couples the second side of the resistor 216 to the ground plane. In the preferred embodiment, the resistor 214 has a value of 4.75 K$\Omega$ and a tolerance of ±1%. The resistor 216 is ideally of much larger value than the resistor 214. The common node between the resistors 216 and 218 is provided to the non-inverting input of an amplifier 220. A capacitor 228 is also connected between the non-inverting input of the amplifier 220 and ground, and serves to stabilize the feedback voltage at this node.

A precision micropower shunt voltage reference 222 is provided to establish a fixed reference signal of approximately 2.5 volts at the inverting input of the amplifier 220 through a current limiting resistor 226. One end of the voltage reference 222 is connected to the ground plane, while the output is connected to one side of the resistor 226. Setup current for the voltage reference 222 is supplied by an external series resistor 224 connected between VBATT+ and the output of the voltage reference 222.

The output of the amplifier 220 is connected to the base of a bipolar transistor 230. A load resistor 232 is provided to connect the emitter of the bipolar transistor 230 to ground. A feedback capacitor 236 further connects the common node between the emitter of the bipolar transistor 230 and the load resistor 232 to a feedback resistor 234. The capacitor 236 and the resistor 234 serve to prevent the circuit from becoming unstable. The other side of the feedback resistor 234 is connected to the inverting input of the amplifier 220.

The collector of the bipolar transistor 230 is coupled to VBATT+ through a ±1% tolerance resistor 244. The collector is also coupled to one terminal of an opto-coupler 238. The opto-coupler 238 is used to adjust the voltage at the FB pin of the PWM 246 based on energy emitted by an internal photo diode 240 as received by an internal photo transistor 242. An increase in current flowing through the photo diode 240 ideally causes a corresponding increase in the current flowing through the photo transistor 242. The anode of the photo diode 240 is connected to VBATT+. When no current is flowing through the photo diode 240, the resistor 244 insures that the opto-coupler 238 is non-functional.

The emitter of the photo transistor 242 is coupled to a ground plane, while its collector is connected directly to the FB input of the PWM 246. The FB input of the PWM 246 is also connected to its VREF output through a pullup resistor 248. The resistor 248 pulls the FB input up to a reference voltage when no current is flowing through the photo transistor 240. The resistor 248 and the photo transistor 242 form a voltage divider at the FB input when the photo transistor 242 is drawing current. A stabilizing capacitor 250 couples the VREF output of the PWM 246 to ground. The FB input is bypassed to ground through a bypass capacitor 252 and a resistor 256 coupled to ground by a second bypass capacitor 254. These bypass components function to reduce electrical noise coupling and stabilize the voltage at the FB input of the PWM 246.

During a typical dithering operation, current is drawn through the control line DITHER_CTL of the AC adapter 124 by the bipolar transistor 204 (FIG. 2A). The current is supplied through a protection resistor 213. The resistor 213 is coupled to the common node between the resistors 214 and 216. Current drawn by the dither control circuitry 122 thereby alters the voltage divider formed by the resistors 214, 216 and 218. As an example of a dithering event, assume that the signal DITHER_CTL is increased from a current amplitude of zero mA to 1 mA. The feedback voltage at the non-inverting input of the error amplifier 220 is regulated, and is compared to the 2.5 volt reference to generate an error signal. Hence, the change in the signal DITHER_CTL causes an error signal of approximately 4.75 volts (4.75 KΩ×1 mA) to be generated at the output of the error amplifier 220. In turn, the increased error signal causes less or no current to flow through the opto-coupler 238. The reduction in current raises the voltage present at the FB input of the PWM 246, which results in an increase in the voltage output VBATT+ of the AC adapter 124. The increase in VBATT+ causes the error signal at the output of the error amplifier to be reduced. Eventually, the DITHER_CTL current of 1 mA causes the AC adapter 124 output voltage VBATT+ to be raised by 4.75 volts.

Under normal operating conditions, the protection resistor 213 has no effect on the dithering process because a regulated current is flowing through it. The protection resistor 213 is included, however, to limit DITHER_CTL current in the event the DITHER_CTL signal line is accidentally shorted to ground or any other undesirable voltage. In this manner, control can be maintained over the output of the AC adapter 124. It should also be noted that the feedback circuitry of FIG. 2B is an exemplary embodiment, and many other circuit topologies could be utilized to adjust the output of the AC adapter 124.

Figure 3:
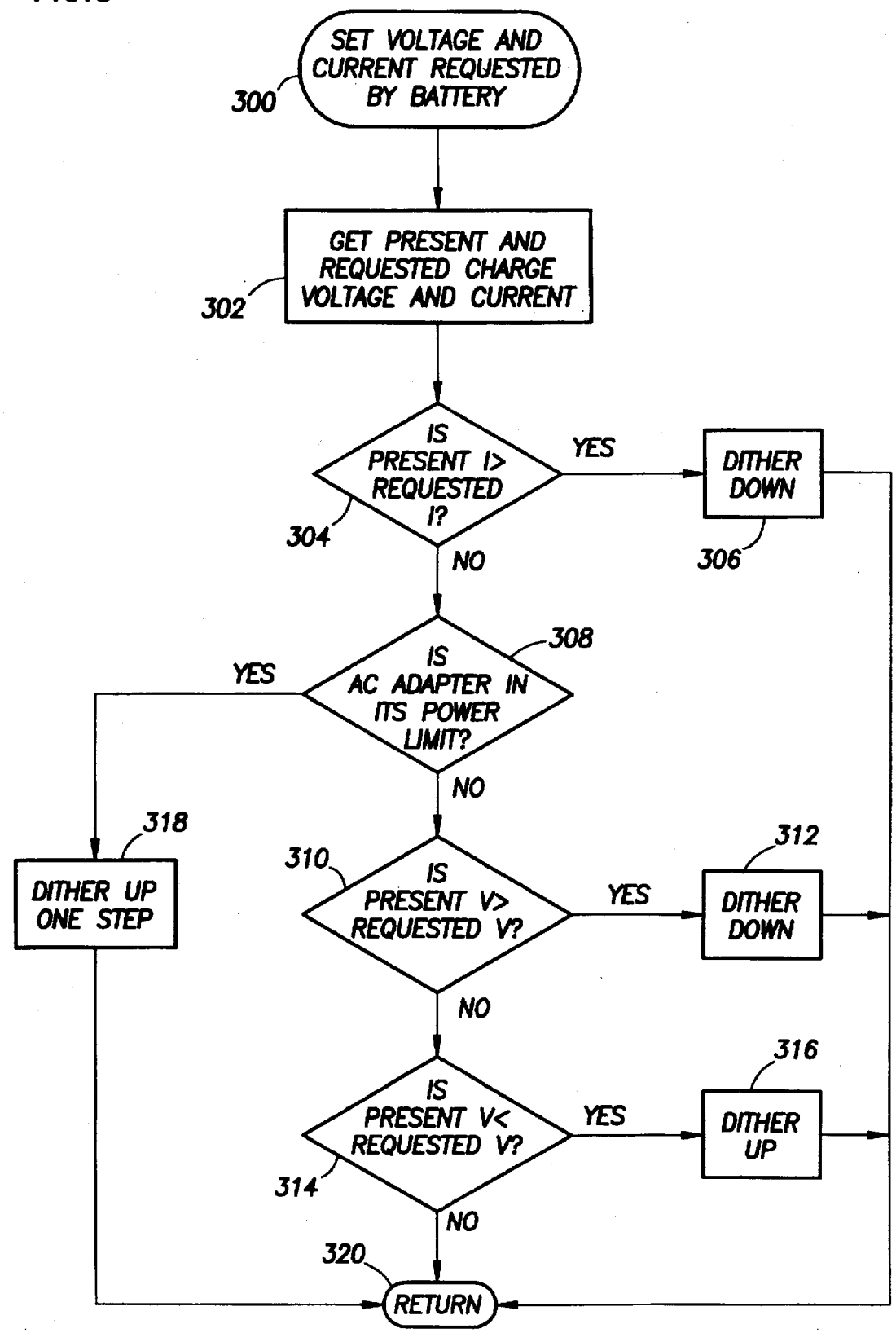
FIG. 3 is a flow diagram illustrating a method according to the invention for generating dither up and dither down commands.

Referring now to FIG. 3, a method according to the invention for generating dither up and dither down commands in MSIO 110 is shown. Control by the multipurpose microprocessor in the MSIO 110 commences at step 300 following a request by the battery pack B to adjust either the charge voltage or the charge current. Control proceeds to step 302, where the multipurpose microcontroller within the MSIO 110 retrieves both the present and the requested charge voltage and charge current. These values are retrieved via communications over the I²C bus. As mentioned above, the present charge voltage and charge current are measured at the battery terminals by monitoring circuit 108. These values are sampled approximately once every two seconds. In the disclosed embodiment, the requested charge voltage and charge current are determined by the charging algorithm implemented in the battery microcontroller 100.

Control next proceeds to step 304, where the MSIO 110 determines if the current presently flowing into the battery 102 is greater than the requested charge current. If so, the MSIO 110 sends a dither down command to the AC dither control circuit 122, thereby lowering the output voltage of the AC adapter 124. In order to reduce the amount of processing required of the MSIO 110 and the battery microcontroller 100 the number of steps to be incremented or dithered can be determined by linear approximation techniques. For example, if the AC adapter 124 output voltage was last dithered up, it is possible to track how many steps were dithered up, as well as the corresponding current change into the battery 102. Using this information, a rough approximation of the number of adjustment steps required to achieve the requested current can be calculated. Because the approximation is not always linear, dither step limits of 1 to 25 steps are imposed in the preferred embodiment. Note that by staying at the maximum charge current limit, the battery cells 102 can be charged as quickly as possible.

Generally, the present invention attempts to regulate the AC adapter output to the requested charge voltage, unless the current into the battery 102 is above a certain limit. If the current is over the predetermined limit, the feedback loop instead attempts to limit the current into the battery 102. In this manner, it is possible to emulate a current limited constant voltage adapter using the AC adapter 124.

If the present charge current is less than the requested charge current as determined in step 304, control proceeds to step 308 and the AC adapter 124 is examined to determine if it is within its power limit. During normal operation, the computer system C is constantly drawing power, and events such as hard drive accesses may cause transients or spikes in power consumption at intermittent intervals. These variances in power consumption may cause the AC adapter 124 to occasionally reach its power limit. If the AC adapter 124 is incapable of supplying power to both the computer system C and the battery pack B at its power limit, the voltage at the output of the AC adapter 124 begins to drop while output current is increased. This drop in voltages causes more current to be supplied to the computer system C and less current to the battery pack B.

In the disclosed embodiment, the AC adapter 124 does not incorporate a signal indicating when it is within its power limit. Hence, the determination in step 308 can be based on the results of the last dithering process. As an example, if the AC adapter 124 output was last dithered up, and the charge voltage or charge current as measured at the battery terminal did not increase, it is generally safe to assume that the AC adapter 124 is in a power limit situation.

If it is determined that the AC adapter 124 is in its power limit, control proceeds to step 318 where the AC adapter output is dithered up by one step. This step aids in preventing the MSIO 110 from erroneously determining that the AC adapter 124 has remained in its power limit in subsequent iterations of the dithering process. If the AC adapter 124 is not in its power limit as determined at step 308, control proceeds to step 310 to determine if the present charge voltage is greater than the requested charge voltage. If so, control passes to step 312 and the AC adapter output is dithered down.

If the present charge voltage is not greater than the requested charge voltage, control proceeds to step 314 where it is determined if the present charge voltage is less than the requested charge voltage. If so, control proceeds to step 316 and the AC adapter output is dithered up. The aforementioned linear approximation technique can be used to determine the appropriate number of dithering steps in both steps 312 and 316. If the present charge voltage is not less than the requested charge voltage as determined in step 314, control passes to step 320 for return to the main MSIO 110 microprocessor routine. Control also passes to step 320 following a dithering event in any of step 306, step 312, step 316, or step 318 of the process described.

Figure 4:
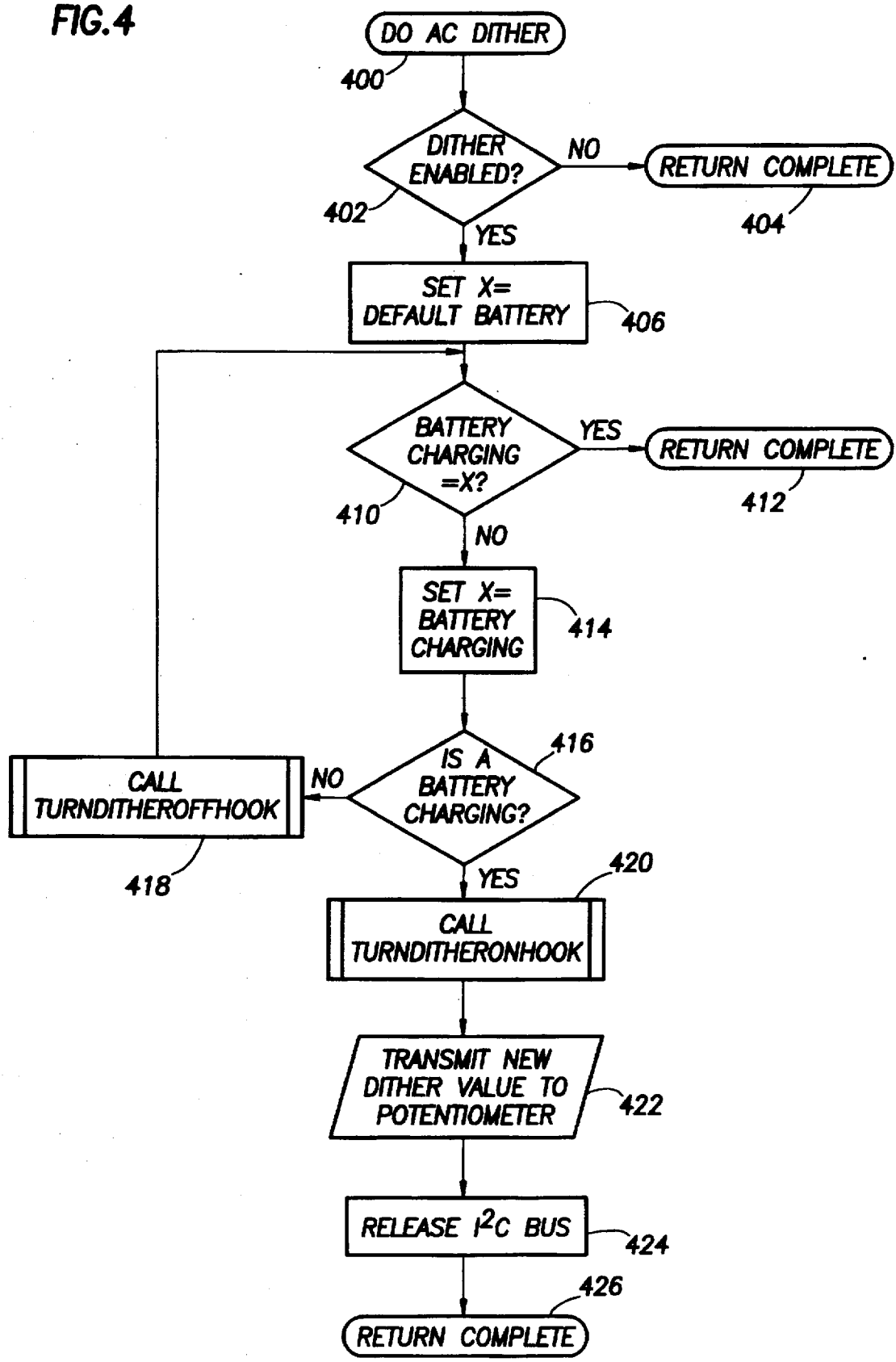
FIG. 4 is a flow diagram illustrating transmission of dither commands in a multiple battery system according to the invention.

Referring now to FIG. 4, a flow diagram is shown illustrating transmission of dither commands in a multiple battery system according to the present invention. The DO AC DITHER routine 400 is called after the new dither value has been determined by the method of FIG. 3 and following a request by a battery pack B to dither the supply voltage (i.e., the request dithering status bit CEI has been set and an attention signal sent to the MSIO 110). A value COMPLETE is returned by the routine 400 if a new dither value is successfully transmitted or if an error occurs. A value IN_PROGRESS is returned if an I²C bus command is in progress.

Control first proceeds to step 402 for determining if dithering is enabled. If not, control passes to step 404 and COMPLETE is returned. If dithering is enabled, control passes to step 406 and a variable X is set to define a default battery address. Control then proceeds to step 410 where it is determined if the address of the battery currently charging equals the default battery address value X. If so, control passes to step 412 where COMPLETE is returned. If the address of the currently charging battery does not equal X, then X is set to equal the battery address of the battery charging in step 414. Control then passes to step 416 where it is determined if a battery is currently charging. If no battery is charging, control proceeds to step 418 and the function TurnDitherOffHook is called. This function disables the dithering process. Following a return from the function, control returns to step 410.

If a battery is charging as determined in step 416, control proceeds to step 420 where the function TurnDitherOnHook is called, enabling the dithering function. Control passes to step 422 where the a dither value is transmitted to the AC dither control circuit 122 via the I²C bus. Next, the I²C bus is released at step 424, followed by return of the value COMPLETE at step 426.

Figure 5:
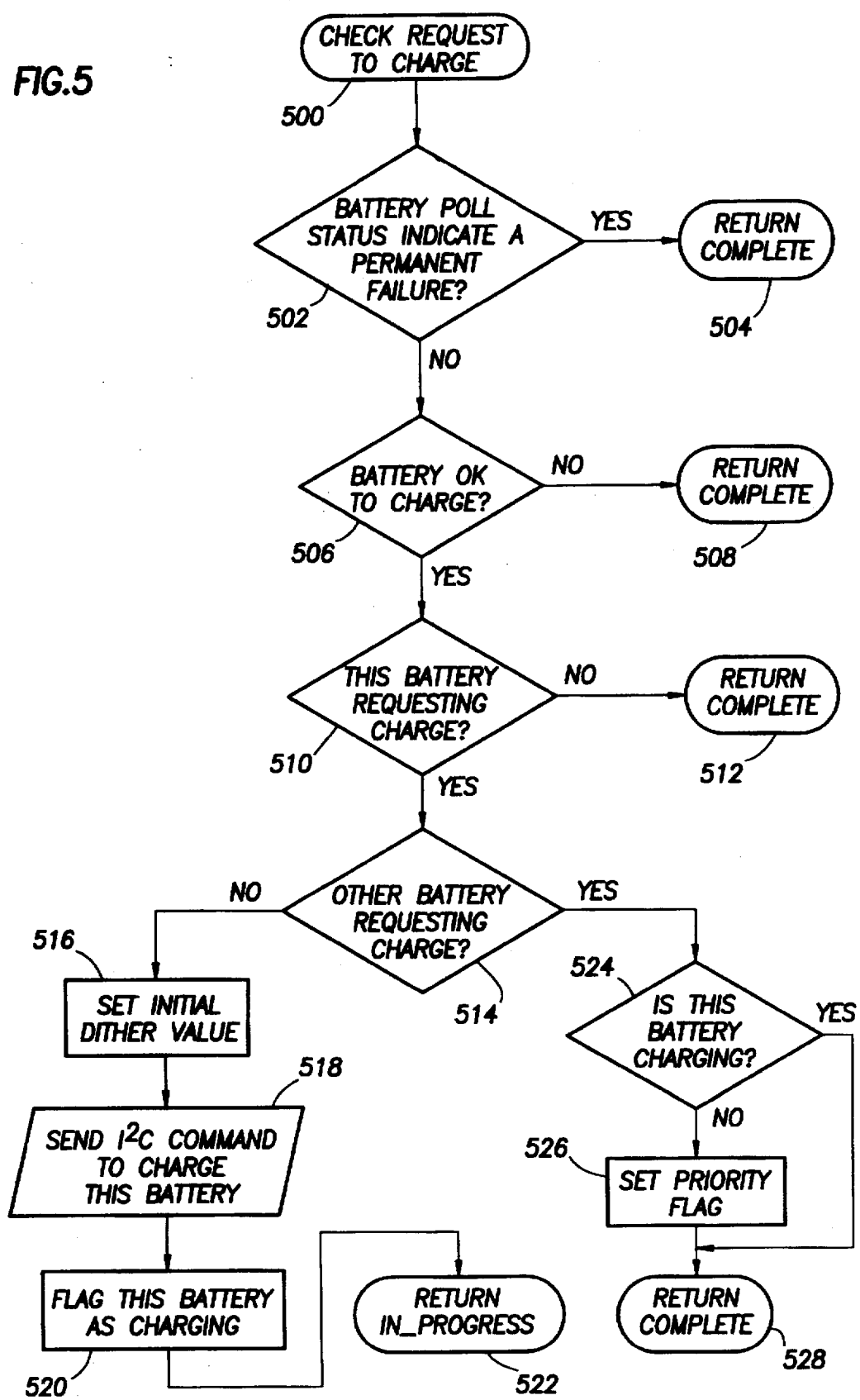
FIG. 5 is a flow diagram of a polling routine for determining when a battery is requesting charging.

Referring now to FIG. 5 a polling or CHECK REQUEST TO CHARGE routine 500 is shown for determining when a battery is requesting charging. The CHECK REQUEST TO CHARGE routine 500 examines a battery that is requesting charging, and, if no other batteries are charging, initiates a battery charging process. The routine returns the value COMPLETE: (1) when finished, (2) if a battery charge has started or (3) if an error has occurred. The value IN_PROGRESS is returned if a battery charge I²C command is in progress.

In an initial step 502, the battery status bits for the battery currently being examined are polled to determine if a permanent failure for the battery is indicated. If the permanent failure bit is set—indicating that the battery can no longer be recharged—control passes to step 504 and the value COMPLETE is returned. If the battery is capable of being recharged, control passes to step 506 to determine if it is permissible to charge the battery. It is not permissible to charge the battery under certain predefined circumstances, such as when the docking motor is running. If it is not permissible to charge the battery, control passes to step 508 and the value COMPLETE is returned. If it is permissible to charge the battery, control instead passes to step 510 where the battery's REQUEST TO CHARGE flag is examined to determine if the battery is requesting charging. Once set, the REQUEST TO CHARGE flag remains set until permission to charge is granted. If the battery is not requesting charging, control proceeds to step 512 and the value COMPLETE is returned.

If the battery is requesting charging as determined in step 510, control proceeds to step 514 to determine if other batteries are currently requesting charging. If no other batteries are requesting charging, control passes to step 516 and an initial dither value is set. Control next proceeds to step 518 where an I²C bus command is sent to charge the battery currently being polled. At step 520, the battery being polled is flagged as charging. The value IN_PROGRESS is then returned in step 522.

If other batteries are requesting charging as determined in step 514, control proceeds to step 524 where it is determined if the battery currently being examined is charging. If not, control passes to step 526 and a priority flag is set for the battery currently being examined such that it will charge if it is of higher priority than other batteries requesting charging. Control then proceeds to step 528 and the value COMPLETE is returned, as is the case if the battery being polled is charging as determined in step 524.

Figure 6A:
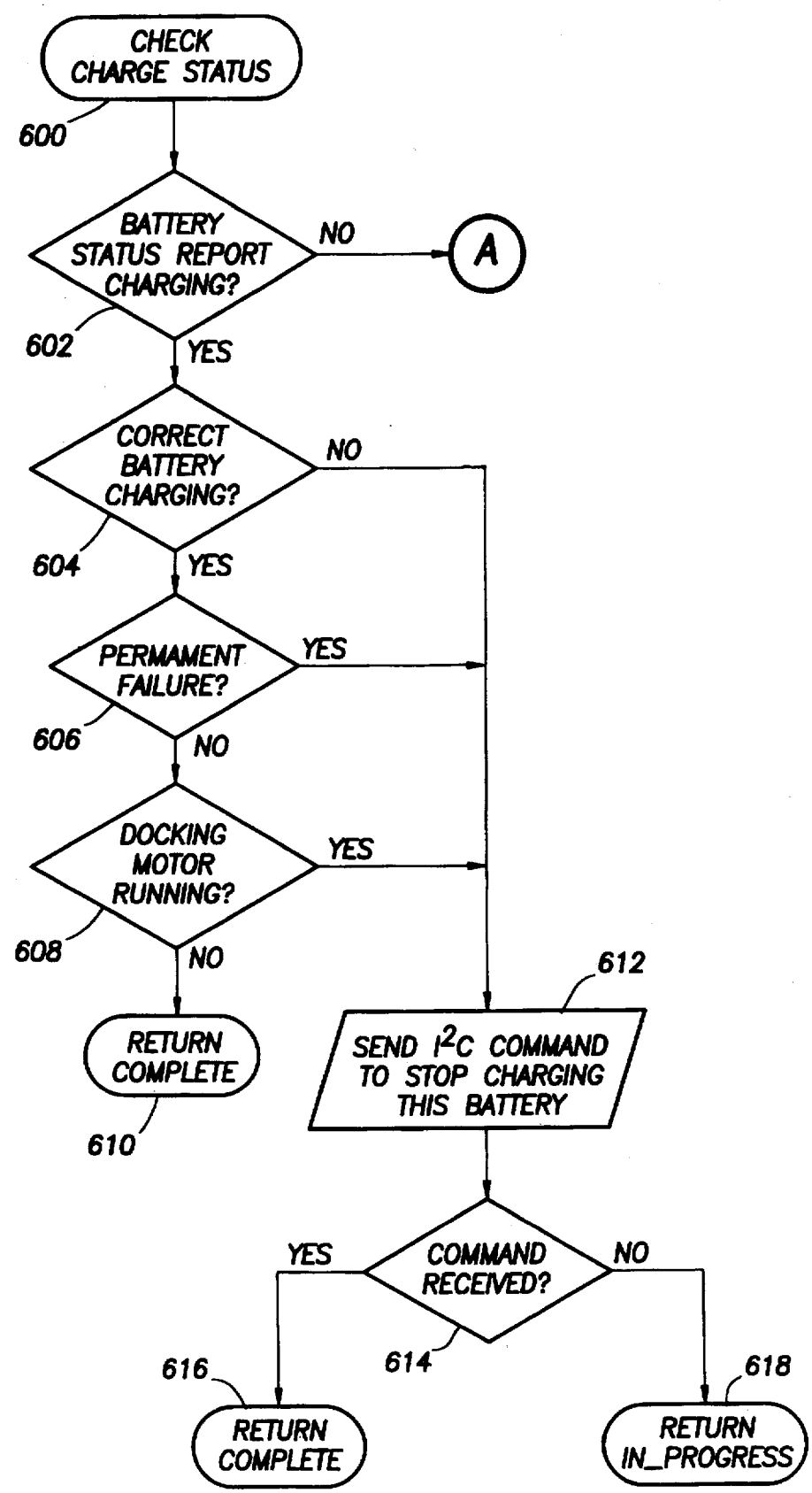
FIGS. 6A and 6B are flow diagrams of a polling routine for checking the charge status of a battery.
Figure 6B:
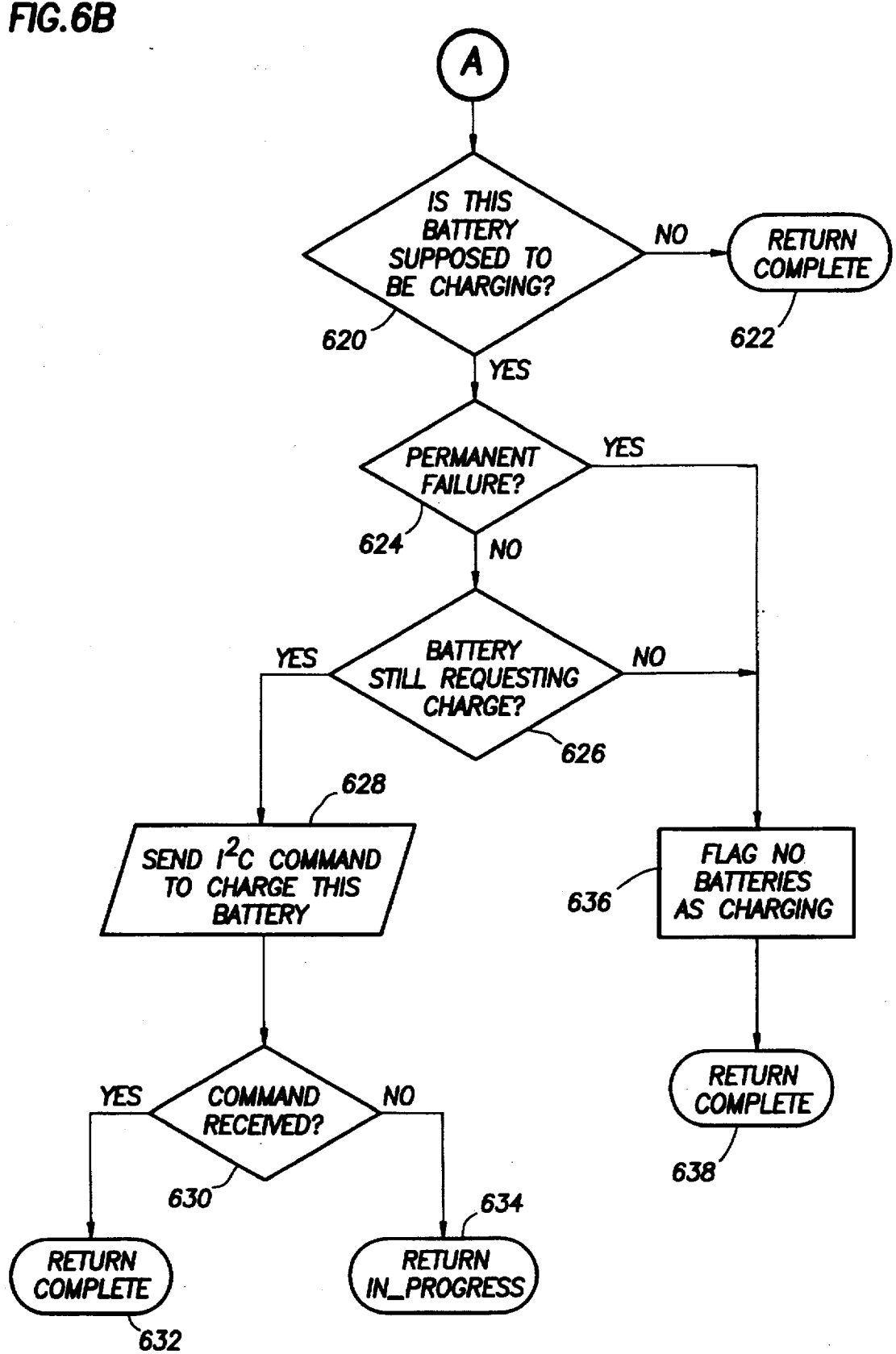

Referring now to FIGS. 6A and 6B, flow diagrams are shown for a polling routine 600 that checks the charge status flag of a battery. This routine verifies that the battery charging status is correct and also handles charge termination. The process commences at step 602, where status bits for the battery currently being polled are examined to determine if the battery is charging. If the battery is charging, control passes to step 604 and the MSIO 110 determines if the correct battery is charging.

If the correct battery is charging, control proceeds to step 606 and the battery status flags are examined to determine if a permanent failure is indicated for the battery. If not, control passes step 608 to determine if the docking motor is running. If the docking motor is not running, the value COMPLETE is returned in step 610. If the incorrect battery is charging as determined in step 604, or if a permanent failure is indicated in step 606, or if the docking motor is running as determined in step 608, control passes to step 612 where an I²C bus command is issued to stop charging the battery. In step 614, if the battery microcontroller 100 then acknowledges the command as received, control passes to step 616 and the value COMPLETE is returned. If the command is not acknowledged, control instead passes to step 618 and the value IN_PROGRESS is returned.

If the battery status bit for the battery currently being examined does not report charging as determined in step 602, control passes to step 620 (FIG. 6B) where it is determined if the battery being examined is supposed to be charging. If not, control passes to step 622 and the value COMPLETE is returned. If the battery being examined is supposed to be charging, control instead passes to step 624 where the battery status bits are examined to determine if a permanent failure is indicated. If not, control passes to step 626 and the status bits for the battery being polled are examined to determine if the battery is still requesting charging. If the battery still desires charging, control flows to step 628 where an I²C bus command is sent to charge the battery currently being polled.

Control proceeds to step 630 to determine if the battery microcontroller 100 has acknowledged the charge command. If so, the value COMPLETE is returned at step 632. Otherwise, the value IN_PROGRESS is returned at step 634. If either permanent failure is indicated at step 624, or the battery is no longer requesting charging as determined in step 626, control passes to step 636 where a flag is set indicating that no batteries are charging. The value COMPLETE is then returned at step 638.

Thus, it can be seen that the present invention provides circuitry for dynamically controlling the voltage at the terminals of a computer system's rechargeable battery. A feedback loop is utilized between sensors located in the battery pack and dithering circuitry that controls the output of the AC adapter being used to charge the battery pack. The effects of parasitic resistances between the AC adapter and battery terminals are thereby negated. Current into the battery pack can be varied as needed by dithering the AC adapter output voltage. The present invention provides numerous advantages over previous approaches, and does not require as much computational overhead in the battery pack as is needed in other commercial solutions.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, comprising:

a rechargeable battery;

a monitoring circuit coupled to said rechargeable battery for measuring the present voltage and current at the terminals of said rechargeable battery;

a battery microcontroller coupled to said monitoring circuit and implementing a recharging routine capable of generating a desired voltage for the terminals of said rechargeable battery;

a multipurpose microcontroller coupled to said battery microcontroller and adapted to generate an adjustment signal based on the present battery terminal voltage and current and the desired battery terminal voltage;

an adjustable output AC adapter having an output voltage signal line coupled to a terminal of said rechargeable battery, and a control input for altering the output voltage signal of said AC adapter; and a dither control circuit coupled to said multipurpose microcontroller and said control input of said AC adapter, said dither control circuit receiving the adjustment signal and communicating a corresponding control signal to said control input of said AC adapter.

2. The computer system of claim 1, further including a serial communications bus coupling said dither control circuit, said multipurpose microcontroller, and said battery microcontroller.

3. The computer system of claim 2, wherein said serial communications bus is essentially compliant with the I²C-bus standard.

4. The computer system of claim 1, wherein said rechargeable battery, said monitoring circuit and said battery microcontroller are incorporated in a detachable battery pack.

5. The computer system of claim 1, wherein said dither control circuit comprises an addressable potentiometer.

6. The computer system of claim 1, wherein said rechargeable battery is comprised of one of the following types: lithium-ion, nickel-metal-hydride, lithium polymer, or zinc-air.

7. A computer system, comprising:

a rechargeable battery;

a monitoring circuit coupled to said rechargeable battery for measuring the present voltage and current at the terminals of said rechargeable battery;

a battery microcontroller coupled to said monitoring circuit and implementing a recharging routine generating a desired voltage for the terminals of said rechargeable battery;

said battery microcontroller further generating an adjustment signal based on the present battery terminal voltage and current and the desired battery terminal voltage;

an adjustable output AC adapter having an output voltage signal line coupled to a terminal of said rechargeable battery, and a control input for altering the output voltage signal of said AC adapter; and a dither control circuit coupled to said battery microcontroller and said control input of said AC adapter, said dither control circuit receiving the adjustment signal and communicating a corresponding control signal to said control input of said AC adapter.

8. The computer system of claim 7, further including a serial communications bus coupling said dither control circuit and said battery microcontroller.

9. The computer system of claim 8, wherein said serial communications bus is essentially compliant with the I²C-bus standard.

10. The computer system of claim 7, wherein said rechargeable battery, said monitoring circuit and said battery microcontroller are incorporated in a detachable battery pack.

11. The computer system of claim 7, wherein said dither control circuit comprises an addressable potentiometer.

12. The computer system of claim 7, wherein said rechargeable battery is comprised of one of the following types: lithium-ion, nickel-metal-hydride, lithium polymer, or zinc-air.

13. A method for controlling the voltage at the terminals of a rechargeable battery in a computer system incorporating an adjustable output AC adapter, the computer system further comprising a monitoring circuit for measuring the voltage and current at the terminals of the rechargeable battery, a battery microcontroller for implementing a recharging algorithm, and a dither control circuit for adjusting the output of the AC adapter, the method comprising the steps of:

retrieving the present voltage and current at the terminals of the rechargeable battery as determined by the monitoring circuit;

calculating the desired voltage and current at the terminals of the rechargeable battery as determined by the recharging algorithm;

generating an adjustment signal based on the present voltage and current and the desired voltage and current; and communicating the adjustment signal to the dither control circuit to modify the AC adapter output voltage such that the adjusted voltage at the terminals of the rechargeable battery approaches the desired voltage.

14. The method of claim 13, wherein the claimed steps are repeatedly performed until the adjusted voltage at the terminals of the rechargeable battery equals the desired voltage.

15. The method of claim 13, wherein the steps of generating an adjustment signal and communicating the adjustment signal to the dither control circuit are performed by a multipurpose microcontroller coupled to the battery micro controller and the dither control circuit.

* * * * *